F. A. BERRY.
RIM TOOL.
APPLICATION FILED MAR. 17, 1916.

1,202,654.

Patented Oct. 24, 1916.

Witnesses:
E. Q. Ruppert
R. M. Smith

Inventor
Frank A. Berry
By Victor J. Evans
Attorney

UNITED STATES PATENT OFFICE.

FRANK A. BERRY, OF LOUDON, TENNESSEE.

RIM-TOOL.

1,202,654.

Specification of Letters Patent. Patented Oct. 24, 1916.

Application filed March 17, 1916. Serial No. 84,889.

*To all whom it may concern:*

Be it known that I, FRANK A. BERRY, a citizen of the United States, residing at Loudon, in the county of Loudon and State of Tennessee, have invented new and useful Improvements in Rim-Tools, of which the following is a specification.

This invention relates to rim tools, the object in view being to produce a tool for unlocking, contracting and expanding a split demountable rim such as those now commonly employed upon automobiles and other vehicles, the tool of this invention embodying a novel arrangement of arms and an operating lever therefor whereby a rim may be unlocked at the meeting extremities thereof, then contracted to a diameter which will admit of the ready application thereto or removal therefrom of a pneumatic or other tire, and subsequently expanded and again locked with the ends of the rim in proper alinement.

With the above and other objects in view, the invention consists in the novel construction, combination and arrangement of parts, as herein described, illustrated and claimed.

Figure 1:
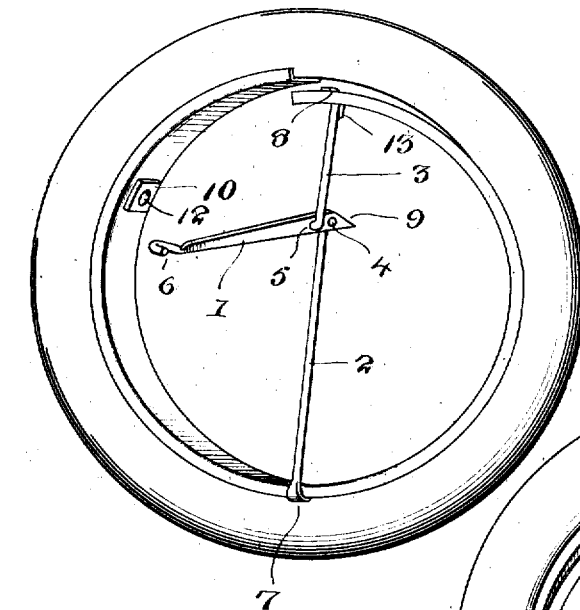
Figure 2:
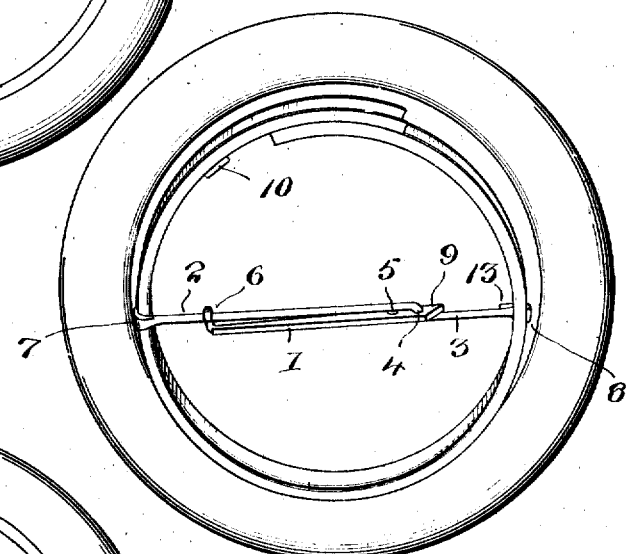
Figure 3:
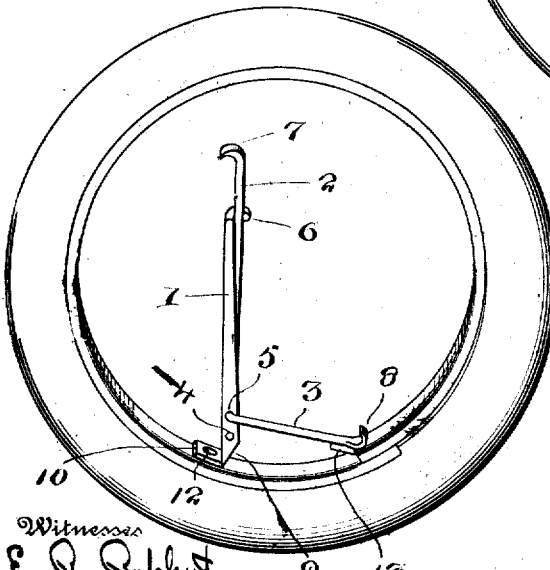
Figure 4:
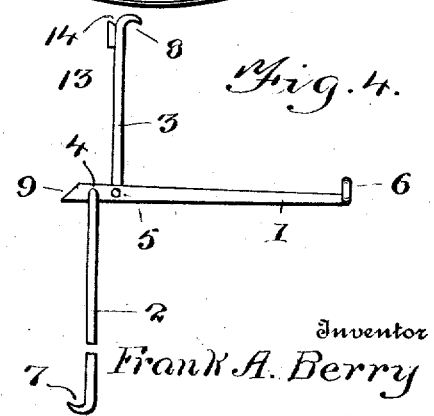

In the accompanying drawings: Figure 1 is a perspective view of a demountable rim and tire illustrating the tool of this invention in its initial relation to the rim. Fig. 2 is a similar view showing the tool in its secondary relation to the rim. Fig. 3 is a similar view showing the manner of utilizing the tool for again expanding and locking the rim. Fig. 4 is a plan view of the tool, per se.

The tool contemplated in this invention comprises a lever 1, and a pair of arms 2 and 3, the arm 2 being shown as longer than the arm 3. The arm 2 is pivotally connected to the lever 1 at 4 while the arm 3 is pivotally connected to said lever at 5, the distance between the pivots 4 and 5 depending upon the degree to which it is necessary to contract the rim in order to enable a tire to be placed thereon or removed therefrom, or conversely to enable the rim to be removed from the tire or replaced therein. The lever 1 is provided with a hook 6 at its extremity, which, when the rim is in its contracted condition is adapted to embrace the arm 2 so as to hold the tool in its rim-contracting position.

The arm 2 is provided at the outer extremity thereof with a hook or lip 7 and the arm 3 is likewise provided at its outer extremity with a hook or lip 8. The hooks or lips 7 and 8 project from opposite sides of the tool when in its rim-contracting position, one of said hooks being adapted to engage one marginal edge of the rim while the other hook engages the opposite marginal edge of the rim. The shorter arm of the lever 1 is beveled as shown at 9 to engage a lug or projection 10, on the inner face of the rim, which is usually provided with a hole 12 to receive the valve tube or neck of the inner tube of a pneumatic tire.

The arm 3 is provided adjacent to the extremity thereof with a projection 13 arranged on the opposite side from the hook 8 and adapted to engage the inner overlapping extremity of the rim prior to expanding the arm to its full diameter after a tire has been placed around the rim. The extreme outer edge of the projection 13 is undercut as indicated at 14 so as to maintain the engagement between said projection and the outer extremity of the rim during the expanding process.

In operation the tool hereinabove described is manipulated as follows: Starting with the rim and tire in their normal positions, one of the hooks 7 and 8 is engaged with the edge of the rim adjacent to one of the extremities thereof as shown in Fig. 1 while the other hook is engaged with the opposite edge of the rim at a substantially diametrically opposite point. The lever 1 is then moved in the proper direction to draw inwardly on that extremity of the rim which is engaged by one of said hooks. This unlocks or breaks joint between the extremities of the rim and causes a slight overlapping of the extremities of the rim as indicated in Fig. 1. The tool is then disengaged from the rim and again applied thereto under the relation shown in Fig. 2. Then the lever 1 is swung to the limit of its movement so as to contract the rim to the full limit provided for by the tool and the hook 6 is then brought into engagement with the arm 26 locking the tool and the rim in the position shown in Fig. 2. After the rim and tire have been again associated, in order to expand the rim, the beveled end 9 of the lever 1 is placed against the lug 10 above referred to while the projection 13 is brought into engagement with the extremity of the rim as shown in Fig. 3. Then by moving the lever 1 in the proper direction, the rim is expanded until the extreme edges thereof are again brought into abutting or locking relation. This completes the entire operation of removing and replacing a tire or conversely of removing and replacing a demountable rim in relation to the tire.

Having thus described my invention, I claim:—

1. In a tool of the class described, the combination of a lever, arms connected to said lever by pivots located in spaced relation to each other, said arms being provided with hooks at their outer extremities, and a projection on one of said arms adapted to engage one extremity of a contracted rim while the extremity of the lever is in engagement with a projection on the inner face of the rim.

2. In a tool of the class described, the combination of a lever, arms connected to said lever by pivots located in spaced relation to each other, said arms being provided with hooks at their outer extremities, and a projection on one of said arms adapted to engage one extremity of a contracted rim while the extremity of the lever is in engagement with a projection on the inner face of the rim, the extremity of said lever being beveled for the purpose specified.

3. In a tool of the class described, the combination of a lever, arms connected to said lever by pivots located in spaced relation to each other, said arms being provided with hooks at their outer extremities, and a projection on one of said arms adapted to engage one extremity of a contracted rim while the extremity of the lever is in engagement with a projection on the inner face of the rim, the extremity of said lever being beveled for the purpose specified, and the extremity of said projection on the arm being undercut for the purpose specified.

In testimony whereof I affix my signature in presence of two witnesses.

FRANK A. BERRY.

Witnesses:
D. F. FERGUSON,
A. N. BLAEND.